United States Patent [19]
Tsutsui et al.

[11] Patent Number: 5,754,127
[45] Date of Patent: May 19, 1998

[54] INFORMATION ENCODING METHOD AND APPARATUS, AND INFORMATION DECODING METHOD AND APPARATUS

[75] Inventors: Kyoya Tsutsui; Mito Sonohara, both of Kanagawa, Japan

[73] Assignee: Sony Corporation, Tokyo, Japan

[21] Appl. No.: 530,319

[22] PCT Filed: Feb. 6, 1995

[86] PCT No.: PCT/JP95/00154

§ 371 Date: Sep. 27, 1995

§ 102(e) Date: Sep. 27, 1995

[87] PCT Pub. No.: WO95/21490

PCT Pub. Date: Aug. 10, 1995

[30] Foreign Application Priority Data

Feb. 5, 1994 [JP] Japan ........................... 6-032951
Mar. 29, 1994 [JP] Japan ........................... 6-059113

[51] Int. Cl.[6] ........................................... H03M 5/22
[52] U.S. Cl. ........................... 341/54; 341/50; 395/2; 395/38
[58] Field of Search ........................... 341/54, 50; 395/2, 395/38

[56] References Cited

U.S. PATENT DOCUMENTS 5,375,189 12/1994 Tsutsui ........................... 395/2.38

*Primary Examiner*—Jeffrey A. Gaffin
*Assistant Examiner*—Jason L. W. Kost
*Attorney, Agent, or Firm*—Limbach & Limbach L.L.P.

[57] ABSTRACT

In this invention, in the case of transforming an input waveform signal into frequency components at a frequency component decomposing circuit 701 to allow the frequency components from the frequency component decomposing circuit 701 to undergo normalization and quantization, and encoding at a normalizing/quantizing circuit 702 and a code train generating circuit 703, operation of QMF is omitted with respect to bands of the unnecessary side by a processing band control circuit 704, whereby the number of operations necessary for filter operation is reduced so that high speed operation can be carried out and work area necessary for filter operation can be reduced. Namely, this invention can simplify filter operation in accordance with, e.g., required quality of reproduction signal, and can reduce circuit scale of encoding unit/decoding unit.

32 Claims, 14 Drawing Sheets

| NO. OF QUANTIZATION ACCURACY INFORMATION | $n_Q$ |
|---|---|
| QUANTIZATION ACCURACY INFORMATION | $Q_1$ |
| QUANTIZATION ACCURACY INFORMATION | $Q_2$ |
| ⋮ | |
| QUANTIZATION ACCURACY INFORMATION | $Q_6$ |
| NORMALIZATION COEFFICIENT INFORMATION | $K_1$ |
| NORMALIZATION COEFFICIENT INFORMATION | $K_2$ |
| ⋮ | |
| NORMALIZATION COEFFICIENT INFORMATION | $K_6$ |
| SPECTRUM COEFFICIENT | $S_1$ |
| SPECTRUM COEFFICIENT | $S_2$ |
| ⋮ | |
| SPECTRUM COEFFICIENT | $S_{32}$ |

FIG.15

INFORMATION ENCODING METHOD AND APPARATUS, AND INFORMATION DECODING METHOD AND APPARATUS

TECHNICAL FIELD

This invention relates to an information encoding method and an information encoding apparatus, and an information decoding method and an information decoding apparatus using so called efficient encoding/decoding, and more particularly to operation of digital filter of so called QMF (Quadrature Mirror Filter) for halving the band with respect to an input signal and IQMF (Inverse QMF) for synthesizing the bands halved by such QMF, and a processing of so called MDCT and IMDCT for synthesizing signals transformed by such MDCT.

BACKGROUND ART

Hitherto, there have been proposed various efficient encoding techniques for audio signals or speech signals, etc. For example, there can be enumerated transform coding which is the blocking frequency band division system of carrying out blocking of a signal on the time base in predetermined time units to transform (spectrum-transform) the signal on the time base every block into a signal on the frequency base to divide it into signal components in a plurality of frequency bands to encode them every respective bands, and Sub Band Coding (SBC) which is the non-blocking frequency band division system of dividing, an audio signal, etc. on the time base into signal components in a plurality of frequency bands without carrying out blocking to encode them, etc. Moreover, there is also proposed a technique in which the Sub Band Coding (SBC) and the transform coding described-above are combined. In this case, for example, an approach is employed to carry out band division by the above-mentioned Sub Band Coding thereafter to spectrum-transform signals every respective bands into signals on the frequency base to encode the spectrum-transformed signals every respective bands.

Here, as a filter for band division used in the above-described Sub Band Coding (band division encoding), there is a filter, e.g., QMF, etc. This filter of QMF is described in the literature "Digital coding of speech in subbands" R. E. Crochiere, Bell Syst. Tech. J., Vol. 55, No. 8 1976.

Moreover, in the literature "Polyphase Quadrature filters-A new subband coding technique", Joseph H. Rothweiler ICASSP 83, BOSTON, filter division technique of equal bandwidth is described.

As an algorithm of calculation provides a more practical sense of the QMF, there is, e.g., an algorithm as described below.

When coefficients of QMF having the number of taps of L are assumed to be $h(0), h(1), \ldots, h(L-1), h(j)=h(L-j-1)$ holds with respect to j in the range expressed as $L/2 \leq j < L$ from the property of QMF. It is now assumed that sampling in a lower frequency band to which QMF is implemented to an input signal $x(n)$ is $z_1(n)$, and sampling in a higher frequency band is $Z_2(n)$. When the following formula (1) is calculated in the case where n is an even number, and the following formula (2) is calculated in the case where n is an odd number, $z_1(n)$ and $Z_2(n)$ are respectively expressed as the following formulas (3) and (4):

$$X_1(n) = \sum_{j=0}^{\frac{L}{2}-1} h(2j)x(n-2j) \quad (1)$$

$$X_2(n) = \sum_{j=0}^{\frac{L}{2}-1} h(2j+1)x(n-(2j-1)) \quad (2)$$

$$z_1(n) = X_1 + X_2(n) \quad (3)$$

$$z_2(n) = X_1 - X_2(n) \quad (4)$$

Since bands are respectively limited to one half with respect to $z_1(n)$, $z_2(n)$, odd numbered samples can be subjected to thinning, and it is therefore unnecessary to calculate them.

Moreover, in the case of IQMF (Inverse QMF) which is inverse filter of QMF, when it is assumed that an input signal in a lower frequency band is $y_1(m)$ and an input signal in a higher frequency band is $y_2(m)$, output $s(n)$ ($n=2m$ and $n=2m+1$) obtained by synthesizing these bands is expressed as the following formulas (5) and (6) when n is equal to $2m$, and is expressed as the following formulas (7), (8) when n is equal to $2m+1$.

$$s(n) = \sum_{i=0}^{\frac{L}{2}-1} h(2i)y_1(m-i) - \sum_{i=0}^{\frac{L}{2}-1} h(2i)y_2(m-i) \quad (5)$$

$$= \sum_{i=0}^{\frac{L}{2}-1} h(2i)(y_1(m-i) - y_2(m-i)) \quad (6)$$

$$s(n) = \sum_{i=0}^{\frac{L}{2}-1} h(2i+1)y_1(m-i) + \sum_{i=0}^{\frac{L}{2}-1} h(2i+1)y_2(m-i) \quad (7)$$

$$= \sum_{i=0}^{\frac{L}{2}-1} h(2i+1)(y_1(m-i) + y_2(m-i)) \quad (8)$$

Further, as the above-described spectrum transform processing, there is, e.g., such a spectrum transform processing to carry out blocking of an input audio signal every predetermined unit of time (frame) to carry out, for every respective blocks, Discrete Fourier Transform (DFT), Discrete Cosine Transform (DCT), or Modified DCT (MDCT), etc. to thereby transform signals on the time base into signals on the frequency base. The above-mentioned MDCT is described in the literature "Subband/Transform Coding Using Filter Bank Designs Based on Time Domain Aliasing Cancellation", J. P. Princen, A. B. Bradley, Univ. of Surrey Royal Melbourne Inst. of Tech. ICASSP 1987.

By quantizing signals divided every bands by filter or spectrum transform processing in this way, it is possible to control bands where quantizing noises are produced. Thus, it is possible to carry out more efficient encoding from a viewpoint of the hearing sense by making use of the property such as so called masking effect, etc. In addition, if there is employed an approach to carry out, prior to implementation of quantization, normalization, every respective bands, e.g., by the maximum value of the absolute values of signal components in corresponding one of the bands, further more efficient encoding can be carried out.

Here, there are many instances where as frequency division width in the case where respective frequency components subjected to frequency band division are quantized, e.g., bandwidths in which the hearing sense characteristic of the human being is taken into consideration are used. Namely, there are instances where an audio signal is divided into signal components in plural (e.g., 25) bands by bandwidths generally called critical bands such that according as frequency shifts to higher frequency band side, bandwidths are broader. Moreover, in quantizing data every respective bands at this time, a predetermined bit allocation is carried out for every respective bands, or an adaptive bit allocation is carried out for every respective bands to carry out quantization. For example, in quantizing coefficient data obtained after having undergone the MDCT processing by the above-mentioned bit allocation, quantization is carried out by adaptive allocated number of bits with respect to MDCT coefficient data every respective bands obtained by MDCT processing every respective blocks. Regarding the bit allocation technique, the following two techniques are known.

For example, in the literature "Adaptive Transform Coding of Speech Signals", R. Zeilinski, P. Noll, IEEE Transactions of Acoustics, Speech, and Signal Processing, vol. ASSP-25, No. 4, August 1977, bit allocation is carried out on the basis of magnitudes of signals every respective bands. In accordance with this system, quantizing noise spectrum becomes flat and noise energy becomes minimum, but actual noise sensed is not optimum because masking effect is not utilized from a viewpoint of the auditory sense.

Moreover, for example, in the literature "The critical band coder—digital encoding of the perceptual requirements of the auditory system", M. A. Kransner MIT, ICASSP 1980, there is described a technique in which the auditory sense masking is utilized to obtain necessary signal-to-noise ratios every respective bands to carry out fixed bit allocation. With this technique, however, even in the case where signal-to-noise ratio characteristic is measured by sine wave input, characteristic values do not become such good values because bit allocation is fixed.

In order to solve these problems, there have been proposed an efficient encoding method and/or an efficient encoding apparatus in which all bits which can be used for bit allocation are used in the state where they are divided into bits for fixed bit allocation pattern. This pattern is determined in advance for every respective small blocks and bits for carrying out bit allocation dependent upon magnitudes of signals of respective blocks to allow the divisional ratio to be dependent upon a signal related to an input signal to allow the divisional ratio with respect to the fixed bit allocation pattern to be greater as spectrum of the signal becomes more smooth.

In accordance with this method, in the case where energies concentrate on a specific component or components as in the case of sine wave input, many bits are allocated to a block or blocks including the spectrum component or components, thereby making it possible to remarkably improve the entire signal-to-noise characteristic. Since the hearing sense of the human being is generally extremely sensitive with respect to signals having sharp spectrum components, improving the signal-to-noise characteristic by using such a method not only results in mere improvement in numeric value measurements, but also is effective for improving sound quality from a viewpoint of the hearing sense.

Regarding the bit allocation method, various methods are proposed in addition to the above. If a model relating to the hearing sense is caused to be more fine and ability of the encoding apparatus (encoder) is enhanced, more efficient encoding from a viewpoint of the hearing sense can be made.

However, in order to utilize these encoding and decoding apparatuses, as compared to the case where sample values of a signal are caused to undergo recording or transmission as they are, large hardware is required. Particularly, in the case where signals to be handled include higher frequency band components and are extended over a broad band, not only is there an increased number of spectrum components to be handled, but also sampling frequency becomes higher. Accordingly, necessary buffer capacity and/or operation processing quantity per unit time would become large.

Meanwhile, these encoding and decoding apparatuses are generally realized by semiconductor. At present, the degree of integration of semiconductor is increasingly becoming higher and the cost is rapidly being lowered. Accordingly, requirement levels for sound quality is becoming higher. For example, in the case of encoding human voice to efficiently record speech (sound) signals corresponding thereto, even if there was satisfactory in early stages the level of a requirement such that it is sufficient to recognize its content, more faithful presence or realism will be required as the technical level becomes higher. While it is of course conceivable to employ a method of raising (improving) the level of the standard such as a method of allowing the bandwidth of a signal to be handled to be greater in accordance with improvement in the technical level, when the standard is changed in this way, compatibility between signals which have been recorded and the decoding unit would be lost. Particularly, in decoding apparatuses constructed on the basis of the old standard, the problem arises that signals encoded by a new standard would fail to be reproduced.

This invention has been made in view of such actual circumstances, and its object is to provide an information encoding method and an information encoding apparatus, an information decoding method and an information decoding apparatus capable of realizing hardware which permits processing to be simplified in accordance with required quality of reproduction signal, has smaller scale and is inexpensive, and permits higher speed operation (computation).

DISCLOSURE OF THE INVENTION

An information encoding method according to this invention is directed to an information encoding method for encoding a waveform signal which can be decomposed into frequency components in predetermined frequency bands, the method comprising the steps of: decomposing the waveform signal into frequency components so that frequency components in a band or bands obtained by omitting a portion of the predetermined bands can be obtained; and encoding the frequency components obtained by the decomposition.

An information decoding method according to this invention is directed to an information decoding method for decoding an encoded signal generated by decomposing a waveform signal which can be decomposed into frequency components in predetermined frequency bands so that frequency components in a band or bands obtained by omitting a portion of the predetermined bands can be obtained to encode the frequency components obtained by the decomposition, the method comprising the steps of: decoding the encoded signal to generate decoded frequency components, specifying the omitted band or bands; synthesizing the decoded frequency components in the state where synthesis processing relating to the specified band or bands is omitted to generate the waveform signal.

Moreover, an information decoding method according to this invention is directed to an information decoding method for decoding an encoded signal generated by decomposing a waveform signal into frequency components in predetermined frequency bands to encode the frequency components obtained by the decomposition, the method comprising the steps of: selecting only a portion of encoded signal components from the encoded signal; decoding the selected encoded signal components to generate decoded frequency components; and synthesizing the waveform signal by using the decoded frequency components.

An information encoding apparatus according to this invention is directed to an information encoding apparatus adapted for encoding a waveform signal which can be decomposed into frequency components in predetermined frequency bands, the apparatus comprising: decomposing means for decomposing the waveform signal into frequency components so that frequency components in a band or bands obtained by omitting a portion of the predetermined bands can be obtained; and encoding means for encoding the frequency components obtained by the decomposition.

Moreover, an information decoding apparatus according to this invention is directed to an information decoding apparatus adapted for decoding an encoded signal generated by decomposing a waveform signal which can be decomposed into frequency components in predetermined frequency bands into frequency components so that frequency components in a band or bands obtained by omitting a portion of the predetermined bands can be obtained to encode the frequency components obtained by the decomposition, the apparatus comprising: decoding means for decoding the encoded signal to generate decoded frequency components; specifying means for specifying the omitted band or bands; and synthesis means for synthesizing the decoded frequency components in the state where synthesis processing relating to the specified band or bands is omitted to generate the waveform signal.

Further, an information decoding apparatus according to this invention is directed to an information decoding apparatus adapted for decoding an encoded signal generated by decomposing a waveform signal into frequency components in predetermined frequency bands to encode the frequency components obtained by the decomposition, the apparatus comprising: selector means for selecting only a portion of encoded signal components from the encoded signal; decoding means for decoding the selected encoded signal components to generate decoded frequency components; and synthesis means for synthesizing the waveform signal by using the decoded frequency components.

As stated above, in accordance with the information encoding/decoding method and the information encoding/decoding apparatus of this invention, actual transform processing for encoding and/or decoding is carried out only in necessary bands, whereby processing is simplified, and encoding and/ or decoding can be carried out at a low cost and/or at a high speed. Moreover, the decoding means can reproduce signals of bands corresponding to its ability from the same recorded code. Thus, it becomes possible to constitute, in accordance with use purpose, decoding means of scale and cost comparable thereto, and it is possible to expand the band of signals to be recorded while maintaining compatibility in correspondence with the ability of the popularized decoding means.

BRIEF DESCRIPTION OF THE DRAWINGS

FIG. 15 is a view showing an example of code train according to the embodiment of this invention.

BEST MODE FOR CARRYING OUT THE INVENTION

Preferred embodiments of this invention will now be described with reference to the attached drawings.

Figure 1:
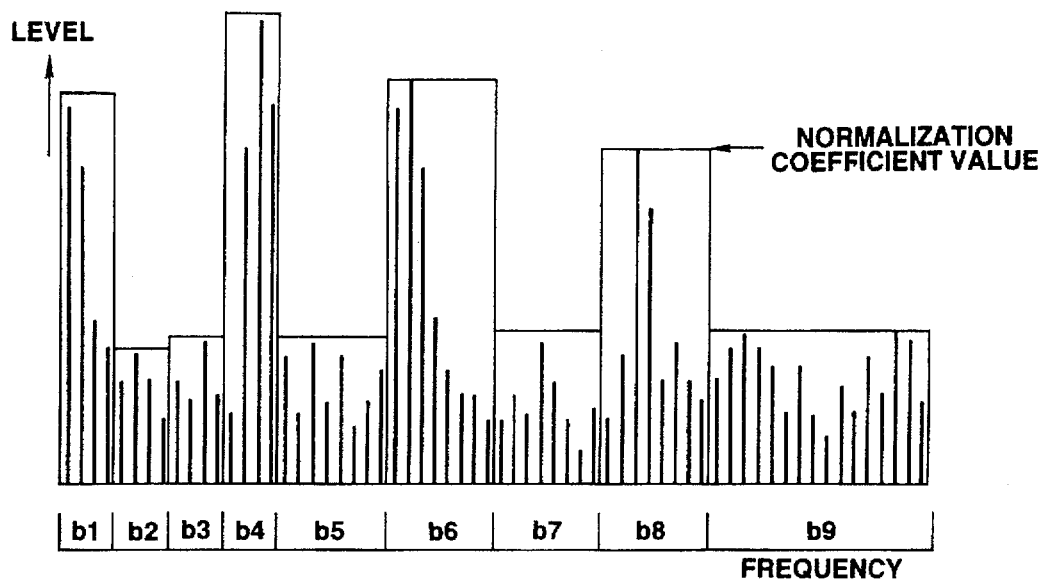
FIG. 1 is a view showing frequency spectrum used for explanation of an embodiment of this invention.

FIG. 1 is a view for explaining an embodiment of an encoding method to which an information encoding method of this invention is applied.

In the embodiment shown in FIG. 1, an input signal is decomposed into spectrum components obtained by spectrum transform processing such as Modified Discrete Cosine Transform, so called MDCT, etc. Respective spectrum components, i.e., respective spectrum coefficients are combined every predetermined bands (9 bands from b1 to b9 in the example of this figure) are caused to undergo normalization processing. Here, the normalization processing refers to a processing for dividing respective spectrum coefficients by normalization coefficients determined by the maximum absolute value of spectrum coefficients in respective bands.

Then, the spectrum coefficients normalized every respective bands are re-quantized a given (allocated) number of bits. The way of giving the number of bits may be fixed regardless of an input signal, or may be such that the number of bits is determined in dependency upon an input signal by taking masking, etc. into consideration. In the encoding apparatus of this embodiment, normalization processing is implemented in this way, thereby making it possible to efficiently re-quantize spectrum coefficients within bands consisting of only spectrum coefficients of low level by lesser number of bits. In addition, in the encoding apparatus of this embodiment, an approach is employed to allow the number of bits for re-quantization to be a fewer, thereby making it possible to compress an original signal.

Figure 2:
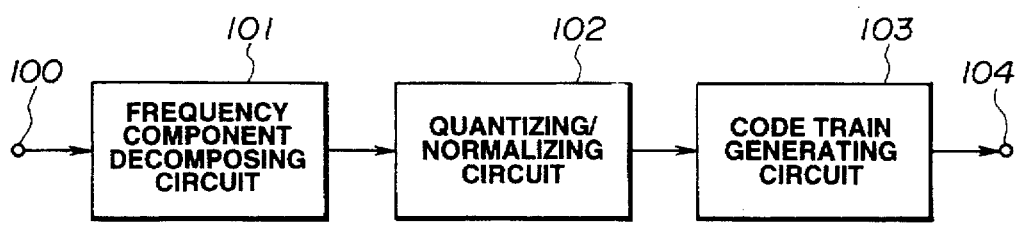
FIG. 2 is a block circuit diagram showing outline of the configuration of an encoding apparatus to which the embodiment of this invention is applied.

FIG. 2 is a block circuit diagram showing an outline of the configuration of an encoding apparatus (unit) to which the information encoding method of this invention is applied.

An audio signal input through input terminal 100 of the encoding unit is decomposed into frequency components (spectrum components) by a frequency component decomposing circuit 101. These frequency components are caused to undergo normalization and re-quantization every predetermined bands by a normalizing/quantizing circuit 102. Thereafter, quantization accuracy information, normalization coefficient information, and, normalized and quantized frequency component information are transformed (changed) into a code train by a code train generating circuit 103. The code train thus obtained is taken out from output terminal 104.

Figure 3:
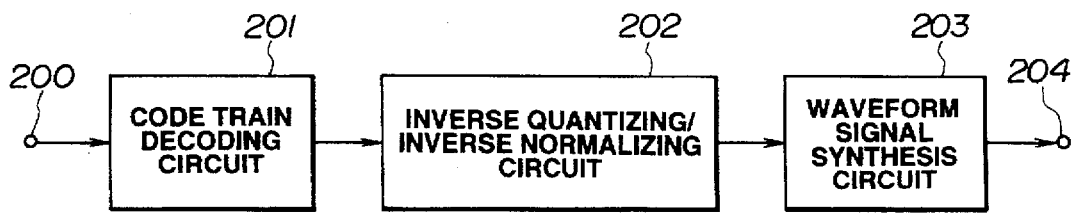
FIG. 3 is a block circuit diagram showing outline of the configuration of a decoding apparatus to which the embodiment of this invention is applied.

On the other hand, FIG. 3 is a block circuit diagram showing outline of the configuration of a decoding apparatus (unit) to which an information decoding method of this invention is applied, corresponding to the encoding apparatus (unit) of the FIG. 2 mentioned above.

A code train inputt to input terminal 200 corresponds to output from the output terminal 104 of the FIG. 2 mentioned above. This code train is separated into quantization accuracy information, normalization coefficient information, and normalized and quantized frequency component information. Then, these information are sent to an inverse quantizing/inverse normalizing circuit 202, at which frequency components are generated. The frequency components thus generated are sent to a waveform signal synthesis circuit 203, at which they are transformed into signals on the time base (hereinafter referred to as a waveform signal). The waveform signal thus obtained is outputted from output terminal 204.

Here, as a method of decomposing an input signal into the frequency components in the frequency component decomposing circuit 101, the above-described spectrum transform processing such as DFT, DCT, or MDCT, etc. may be used, or band division filter may be used. In addition, there may be employed as shown in FIG. 4 a configuration in which the band division filter and the above-described spectrum transform processing are combined.

Figure 4:
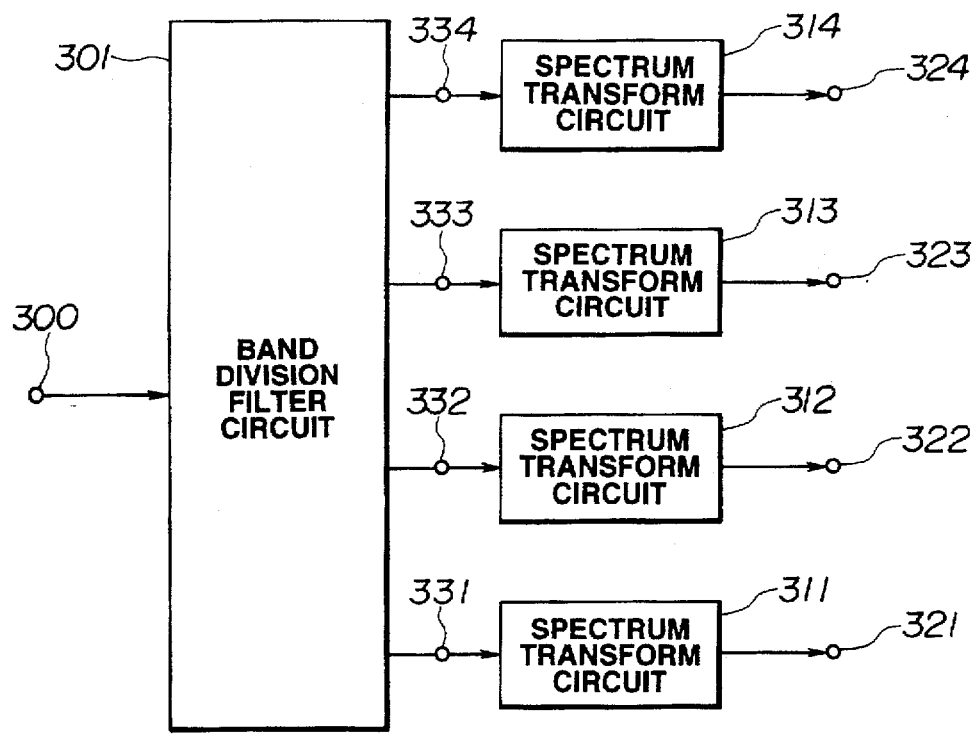
FIG. 4 is a block circuit diagram showing outline of the configuration of a frequency component decomposing circuit used in the encoding apparatus of FIG. 2.

In the example of FIG. 4, a waveform signal input from input terminal 300 is divided into signals (signal components) by a band division filter circuit 301. From respective terminals 331, 332, 333, 334, signals of bands of frequencies which become higher in succession from lower frequency in order recited are respectively obtained. These signals have a bandwidth which is one fourth (¼) that of the input waveform signal of the terminal 300, and respective sampling rates are one fourth (¼) that of the input waveform signal. Accordingly, spectrum transform circuits 311, 312, 313, 314 which spectrum-transform these signals can obtain in practice the same frequency resolution by transform length which is one fourth of that in the case where an input signal is directly spectrum-transformed. Frequency components from spectrum transform circuits 311, 312, 313, 314 are respectively taken out through output terminals 321, 322, 323, 324.

Figure 5:
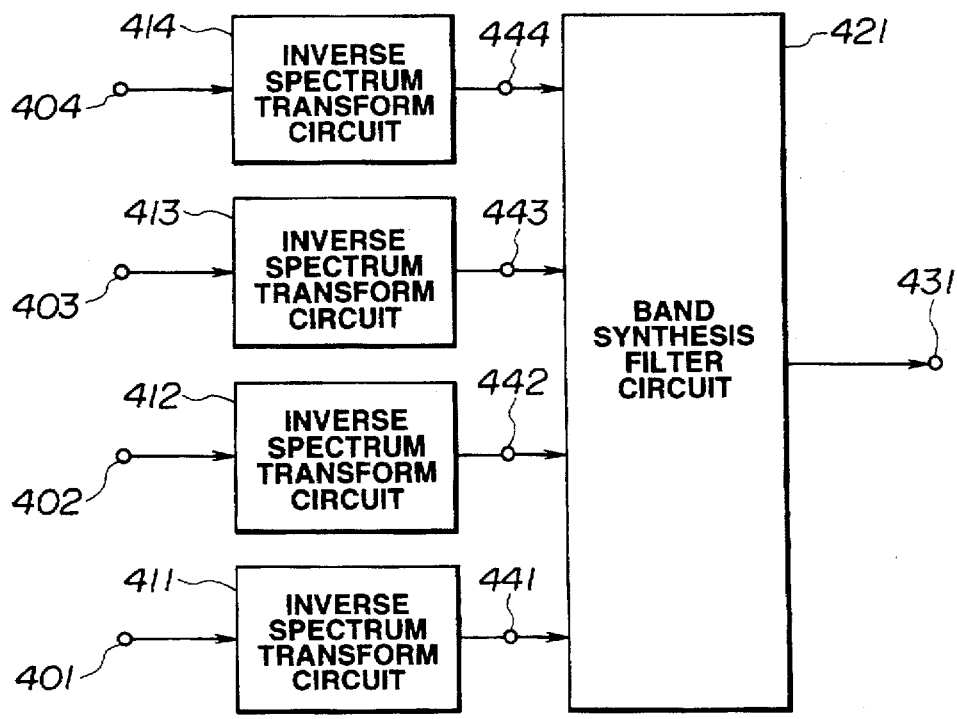
FIG. 5 is a block circuit diagram showing outline of the configuration of a waveform signal synthesis circuit used in the decoding apparatus of FIG. 3.

FIG. 5 shows an example of the configuration of the waveform signal synthesis circuit 203 of FIG. 3 corresponding to the case where the frequency component decomposing circuit 101 of FIG. 2 is caused to be of the structure of FIG. 4. Inputs to input terminals 401, 402, 403, 404 of this waveform signal synthesis circuit respectively correspond to outputs from output terminals 321, 322, 323, 324 of FIG. 4.

Sampling rates of signals of respective bands outputted through output terminals 441, 442, 443, 444 from inverse-spectrum transform circuits 411, 412, 413, 414 respectively correspond to signals of respective bands outputted from terminals 331, 332, 333, 334 of the FIG. 4 mentioned above. Signals of respective bands outputted through these terminals 441, 442, 443, 444 are synthesized by a band synthesis filter 421, thereby making it possible to reproduce a waveform signal. The synthesized waveform signal thus obtained is taken out from output terminal 431.

Figure 6:
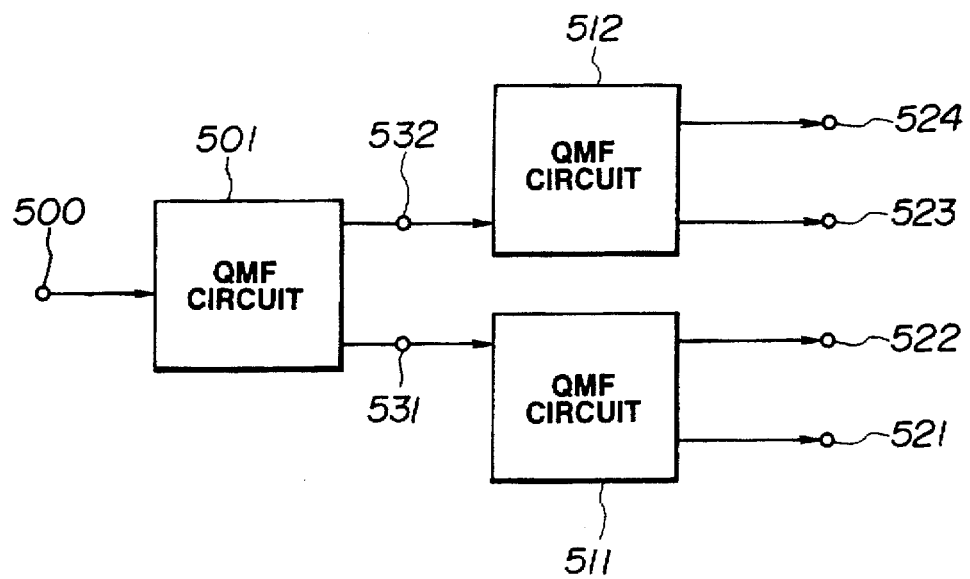
FIG. 6 is a block circuit diagram showing an example of the configuration of a band decomposition filter circuit.
Figure 7:
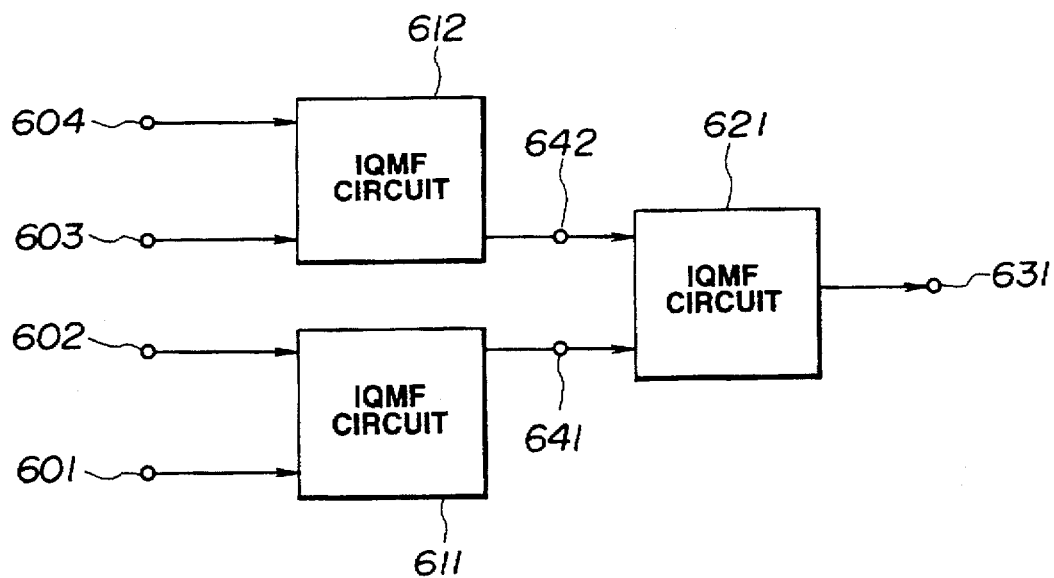
FIG. 7 is a block circuit diagram showing an example of the configuration of a band synthesis filter circuit.

FIGS. 6 and 7 respectively show examples of the configurations of the band division filter circuit 301 of FIG. 4 and the band synthesis filter circuit 421 of FIG. 5.

Namely, the band division filter circuit 301 of FIG. 4 is composed, as shown in FIG. 6, of a QMF circuit 501 for halving (dividing) an input signal from terminal 500 into a higher frequency band signal and a lower frequency band signal, and QMF circuits 511, 512 for further halving (dividing) an output of the QMF circuit 501. From respective terminals 521, 522, 523, 524, signals of bands of frequencies which become higher in succession from lower frequency in order recited are respectively obtained. Moreover, the band synthesis filter circuit 421 of FIG. 5 is composed, as shown in FIG. 7, of IQMF circuits 611, 612 for respectively synthesizing signals of two bands divided by the QMF circuits 511, 512, and a QMF circuit 621 for synthesizing outputs of these IQMF circuits 611, 612.

As stated above, QMF and IQMF are used to constitute a band division filter circuit and a band synthesis filter circuit, thereby making it possible to cancel the influence of aliasing resulting from the fact that sampling rate is caused to be lower after band division.

Let us now consider the case where the above-described encoding apparatus and decoding apparatus are used to record and reproduce an acoustic signal. In most acoustic signals, important signal components concentrate on a specific band or bands, particularly on the lower frequency band side. While it is a matter of course that signal components of higher frequency bands are reproduced, whereby sound quality is improved and acoustic signals having higher presence or realism can be obtained, even if only signals on the lower frequency band side are reproduced, a user can understand the content of speech, and can also enjoy music by tolerable or permissible sound quality.

While a large quantity of processing are required in the above-described encoding apparatus/decoding apparatus as compared to the case where sample values of an original waveform signal are recorded as they are, if sound of tolerable or permissible sound quality can be subjected to compression recording and expanding reproduction in a simple manner, this is very convenient. Such a simple encoding apparatus and decoding apparatus is particularly useful with respect to the following cases.

The first case is where it can be recognized in advance that only signals of the lower frequency band side are ultimately required at the stage for carrying out signal compression for a certain application with the above-described reason for a background. As for encoding, this first case corresponds to the instance where the band of a signal input is limited in advance, or the case where it is designated at the time of encoding that it is sufficient to neglect signals of the higher frequency band side. On the other hand, as for decoding, the above-mentioned first case corresponds to the case where an inputted code train consists of only information with respect to signals of the lower frequency band side, or the case where it is designated at the time of decoding that it is sufficient to neglect signals of the higher frequency band side.

The second case is where the decoding apparatus determines a band subject to reproduction in accordance with the ability of the decoding apparatus. In this case, the decoding apparatus itself selects information of reproducible band from a given code train to carry out decoding. When such an approach is employed, different signals would be reproduced from the same code train depending upon the type of decoding apparatuses, and they appear as difference of sound quality of that reproduction signal. This means that it becomes possible to introduce, without producing the problem of compatibility, decoding apparatuses in which, in the process where cost of the decoding apparatus is lowered with passage of time, sound quality is gradually improved.

A method of this invention for realizing, in a simple manner, an apparatus for encoding or decoding sound of such a limited band will now be described with reference to the corresponding drawings.

Figure 8:
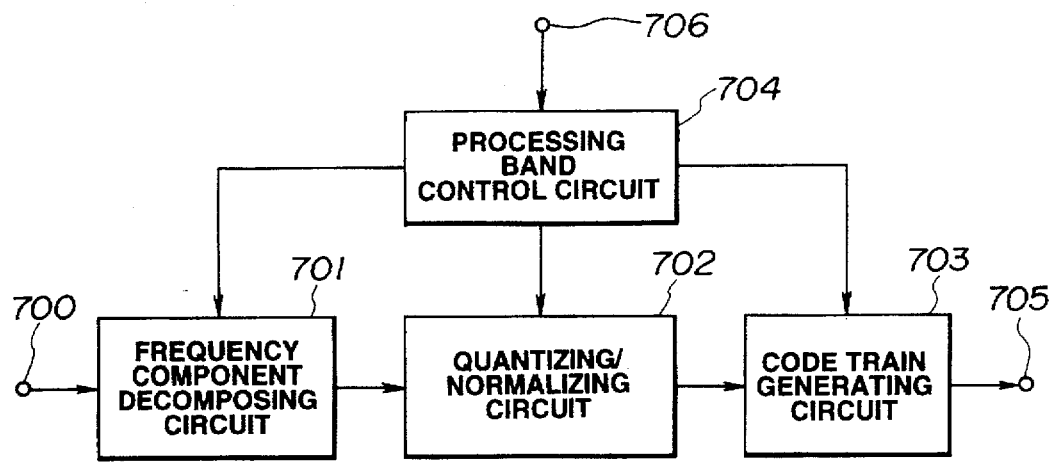
FIG. 8 is a block circuit diagram showing outline of the configuration of an encoding apparatus of an embodiment of this invention.

FIG. 8 is a block circuit diagram showing an example of the configuration of an encoding apparatus (unit) for coping with the above-mentioned first case. A processing band control circuit 704 operative also as arithmetic (processing) control means is supplied with processing band control information through terminal 706. The processing band control circuit 704 controls, on the basis of the processing band control information, processing band of a frequency component decomposing circuit 701, a normalizing/quantizing circuit 702 and a code train generating circuit 703. In this example, for processing band control information delivered through terminal 706, an operator of the encoding unit may input such information, or such information may be given-from, e.g., a band limit filter (not shown) for delivering an input signal through terminal 700.

The frequency component decomposing circuit 701 has a configuration fundamentally similar to the frequency component decomposing circuit 101 of FIG. 2, but carries out processing of only necessary band or bands on the basis of control information sent from the processing band control circuit 704 to the frequency component decomposing circuit 701. For example, in the case of encoding signals (signal components) only consisting of bands from b1 up to b6, the spectrum transform circuits 313, 314 of FIG. 4, which process signals in higher frequency bands carry out no processing. Moreover, in the case where the band division filter circuit 301 of FIG. 4 has the configuration of FIG. 6, since processing of the QMF circuit 512 of FIG. 6 is also unnecessary, this processing is not carried out.

The normalizing/quantizing circuit 702 and the code train generating circuit 703 of FIG. 8 similarly carry out only processing in necessary bands on the basis of respective control information from the processing band control circuit 704. Since quantitao subject to arithmetic processing can be greatly lessened by carrying out only processing in necessary bands in this way, it is possible to carry out processing at a low cost and at a high speed. In addition, in the case where such a processing is carried out by an electric circuit, power consumed in the circuit can be reduced.

It is to be noted that this encoding apparatus or method is not necessarily limited to an apparatus or a method for processing inputted acoustic signals on real time basis. For example, in the case where there is employed a system for compressing, by the above-described method, information of a file in which sample values of a waveform signal are recorded as they are to record them onto a magneto-optical disc, etc., it is more convenient to allow such processing to be completed in shorter time. Implementation of processing at a high speed by the method of this invention is very meaningful for such purpose.

Figure 11:
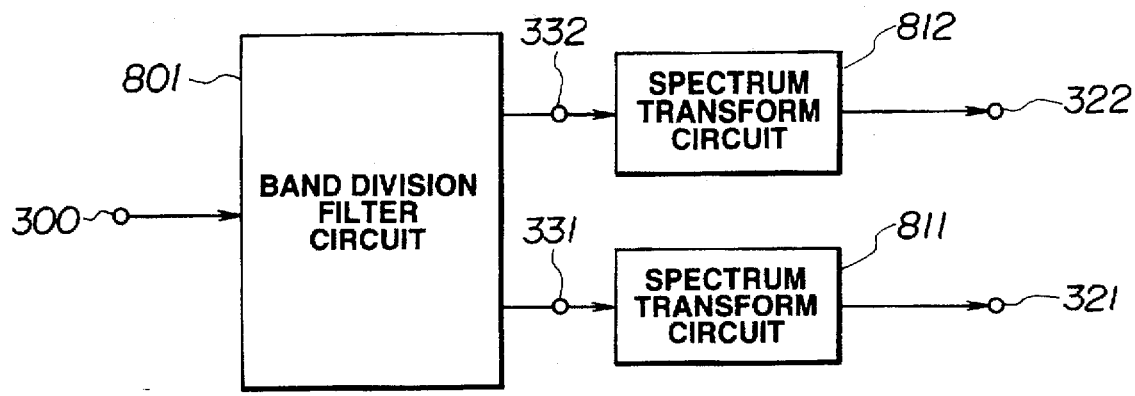
FIG. 11 is a block circuit diagram showing outline of the configuration of a frequency component decomposing circuit used in the encoding apparatus of the embodiment of this invention.
Figure 12:
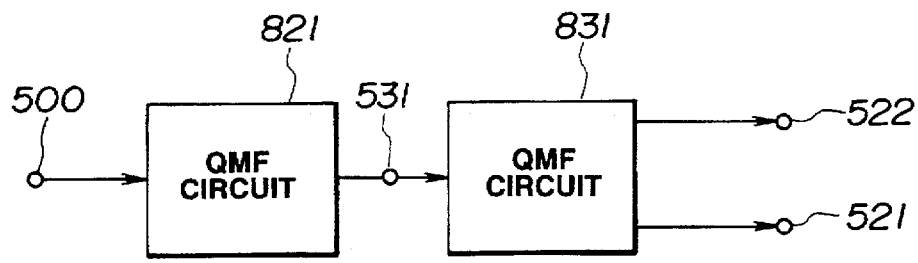
FIG. 12 is a block circuit diagram showing an example of the configuration of a band decomposition filter circuit used in the embodiment of this invention.

Moreover, it is not necessarily required that the configuration of the frequency component decomposing circuit 701 be the same as the configurations of FIG. 4 and FIG. 6. For example, there may be employed configuration as shown in FIGS. 11 and 12 such that the circuit is constituted on a smaller scale from the beginning. The same signal 300 as the signal 300 of the band division filter circuit 301 of FIG. 4 is input into band division filter circuit 801 shown in FIG. 11, and this band division filter circuit 801 sends signals of the lower frequency band side of the signal 300 to spectrum transform circuits 811, 812. The spectrum transform circuits 811, 812 carry out the same processing as those of the spectrum transform circuits 311, 312 of FIG. 4. FIG. 12 shows another example of the configuration of the band division filter circuit 801. Except that an output of a QMF circuit 821 is caused to be only signals of the lower frequency band side, QMF circuits 821, 831 respectively carry out the same processing as those of QMF circuits 501, 511 of FIG. 6. It is to be noted that, in this case, it is sufficient that processing band control circuit 704 of FIG. 8 is not particularly provided.

An example of a code train of one block obtained as the result of the claimed encoding process is shown in FIG. 15. In this example, the value of No. of quantization accuracy information $n_Q$, e.g., $n_Q=6$ is first recorded at the leading portion of a recording medium. Then, quantization accuracy information Q, normalization coefficient information K and spectrum coefficient information S up to bands where encoding has been implemented in practice are recorded. As a recording method for code train, various methods may be employed in addition to the above. For example, there may be adopted a recording method such that dummy quantization accuracy information, e.g., information in which, e.g., the number of bits of quantization is 0 (zero) is recorded as quantization accuracy information Q for bands b7, b8, b9 without recording No. of quantization accuracy information $n_Q$.

Figure 9:
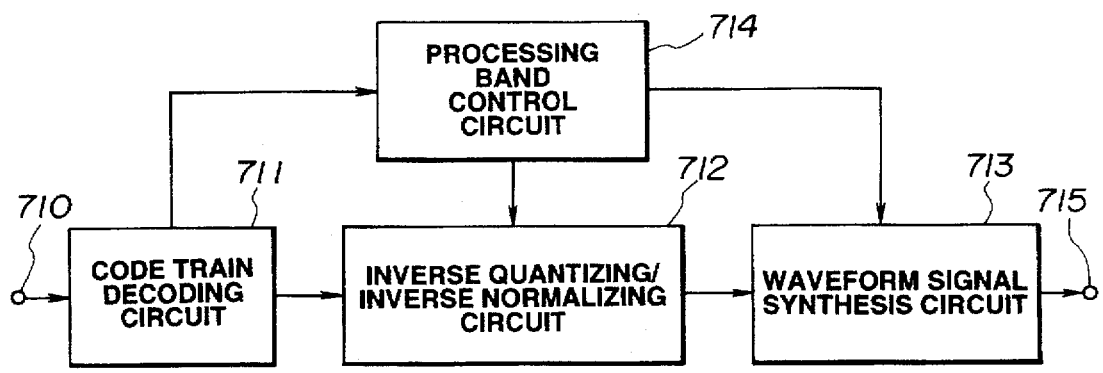
FIG. 9 is a block circuit diagram showing outline of the configuration of a decoding apparatus of an embodiment of this invention.

FIG. 9 is a block circuit diagram showing an example of the configuration of a decoding apparatus in accordance with the first case. A code train decoding circuit 711 receives, as an input signal, e.g., a code train as shown in FIG. 15 to send information for restoring normalized and quantized spectrum coefficients, i.e., quantization accuracy information Q, normalization coefficient information K and spectrum coefficient information S to an inverse quantizing/inverse normalizing circuit 712, and to send No. of quantization accuracy information $n_Q$ to a processing band control circuit 714. The processing band control circuit 714 calculates, on the basis of No. of quantization accuracy information $n_Q$, bands in which processing necessary for decoding is required, so that processing of the inverse quantizing/inverse normalizing circuit 712 and a waveform signal synthesis circuit 713 are caused to be only processing in necessary bands. Thus, similar to the case of the encoding apparatus shown in FIG. 8, this decoding apparatus can omit, e.g., processing of the inverse spectrum transform circuit 413, 414 of FIG. 5 and the IQMF circuit 612 of FIG. 7, and can thus significantly reduce arithmetic processing. For this reason, it is possible to carry out processing at a low cost and at a high speed. In addition, it is possible to reduce power consumed in the circuit in the case where these processing are carried out by an electric circuit.

It is to be noted that the decoding means or method is not necessarily limited to means or method for processing an acoustic signal, etc. on the real time basis to output it. For example, in the case where there is employed, e.g., a system such that a code train in file form after undergone compression is decoded to record sample values (data) of a waveform signal onto a magneto-optical disc, etc. as they are, it is more convenient to allow such processing to be completed in shorter time. Implementation of processing at a high speed by the method of this invention is very meaningful for this purpose.

Figure 10:
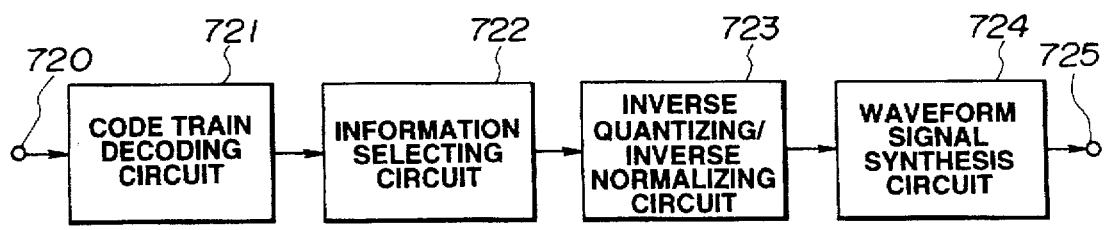
FIG. 10 is a block circuit diagram showing outline of the configuration of a decoding apparatus of another embodiment of this invention.
Figure 16:
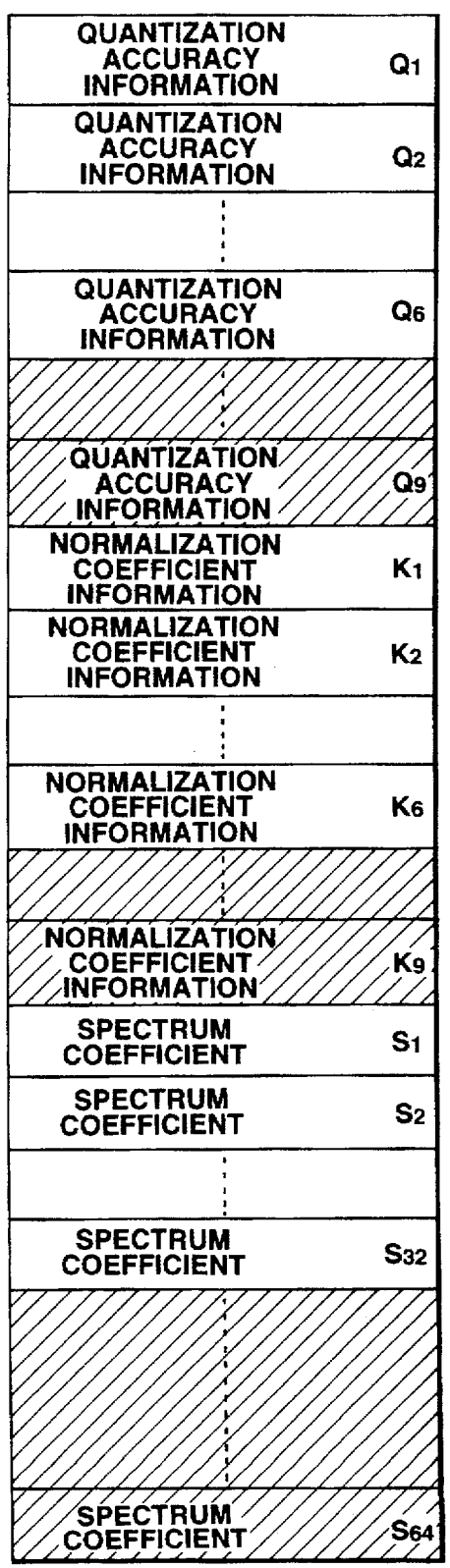
FIG. 16 is a view showing another example of code train according to the embodiment of this invention.

FIG. 10 is a block circuit diagram showing an example of the configuration of a decoding apparatus in accordance with the abovementioned second case. The decoding apparatus of this embodiment receives, as input, a code train as shown in FIG. 16, for example.

Figure 13:
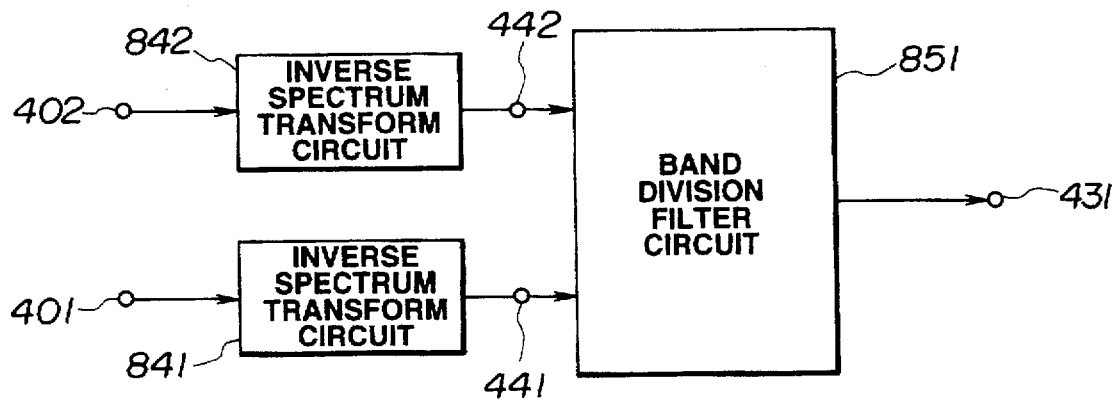
FIG. 13 is a block circuit diagram showing outline of the configuration of a waveform signal synthesis circuit used in the decoding apparatus of the embodiment of this invention.
Figure 14:
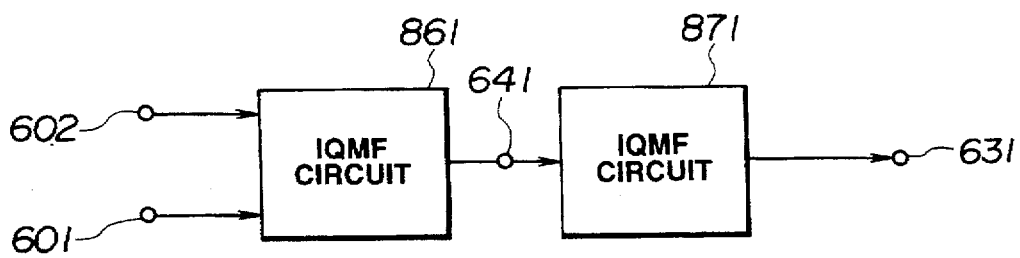
FIG. 14 is a block circuit diagram showing an example of the configuration of a band synthesis filter circuit used in the embodiment of this invention.

A waveform signal synthesis circuit 724 of FIG. 10 has a configuration as shown in FIG. 13, and a band synthesis filter circuit 851 of FIG. 13 has a configuration as shown in FIG. 14. Referring against to FIG. 13, inverse spectrum transform circuits 841, 842 respectively carry out the same processing as those of the inverse spectrum transform circuits 411, 412 of FIG. 5, and an IQMF circuit 861 carries out the same processing as that of the IQMF circuit 611 of FIG. 7. In addition, an IQMF circuit 871 uses a signal where the value is 0 (zero) in place of an input signal from terminal 642 to carry out the same processing as that of IQMF circuit 621 of FIG. 7.

Here, an information selecting circuit 722 of FIG. 10 selects information of bands that this decoding apparatus can process from an output of a code train decoding circuit 721. Namely, since this decoding apparatus can process only bands from b1 up to b6 of FIG. 1, the information selecting circuit 722 selectively sends only information of the portion where no slanting lines are implemented in FIG. 16 to an inverse quantizing/inverse normalizing circuit 723. The inverse quantizing/inverse normalizing circuit 723 composes respective spectrum coefficients on the basis of this information, and the waveform signal synthesis circuit 724 transforms these spectrum coefficients to synthesize a waveform signal. Processing quantity of the waveform signal synthesis circuit 724 is much less than that in the case where signals of all bands are synthesized. Moreover, it is possible to constitute the waveform signal synthesis circuit 724 with a simple circuit as described above, and to carry out processing at a high speed. Similarly to the first case, the decoding apparatus or method mentioned above is not necessarily limited to an apparatus or a method for processing acoustic signals, etc. on a real time basis to output them.

While this invention can function effectively with respect to both the first case and the second case in the manner stated above, this invention is particularly effective in such cases when a band is divided thereafter to implement spectrum transform processing to obtain spectrum signals as described above. For example, in the case where processing of spectrum transform/spectrum inverse transform such as MDCT, IMDCT, etc. is carried out as described in the Japanese Patent Application Laid Open No. 183442/1993 that the applicant of this invention has already proposed, it is known that such transform processing can be realized by a lesser amount of arithmetic processing quantity as compared to the case where operation method of Fast Fourier Transform (FFT) is used. In the case of carrying out FFT, a work area proportional to transform length for storing arithmetic processing result in the course thereof is required as described, e.g., in the literature "Fast Fourier Transform", written by B. Oran Bringham and translated by Miyagawa and Imai, Kagaku Gijutsu Shuppan Sha. Information within the work area is subjected to arithmetic processing while undergoing shuffling. For this reason, in the case where spectrum transform processing is realized by using FFT without carrying out band division, a large work area is required, and the reduction in arithmetic processing is also small as compared to the method for carrying out band division in which spectrum transform processing in bands where no processing is carried out can be omitted to carry out spectrum transform processing.

Moreover, this invention is also similar to the above in regards to processing at the time of decoding. Namely, a method of carrying out band division thereafter to inversely transform spectrum-transformed spectrum coefficients into a waveform signal is only required to have smaller work area and has greater arithmetic processing quantity reduction effect as compared to a method of inversely transforming spectrum-transformed spectrum coefficients into a wave form signal without carrying out band division. Further, while it is required for carrying out FFT at a high speed that such work area is of a structure capable of carrying out read/write operation at a sufficiently high speed, the fact that the transform length can be reduced signifies that necessary work area can be reduced so that an encoding apparatus and a decoding apparatus can be constituted by lower cost in correspondence therewith.

Figure 17:
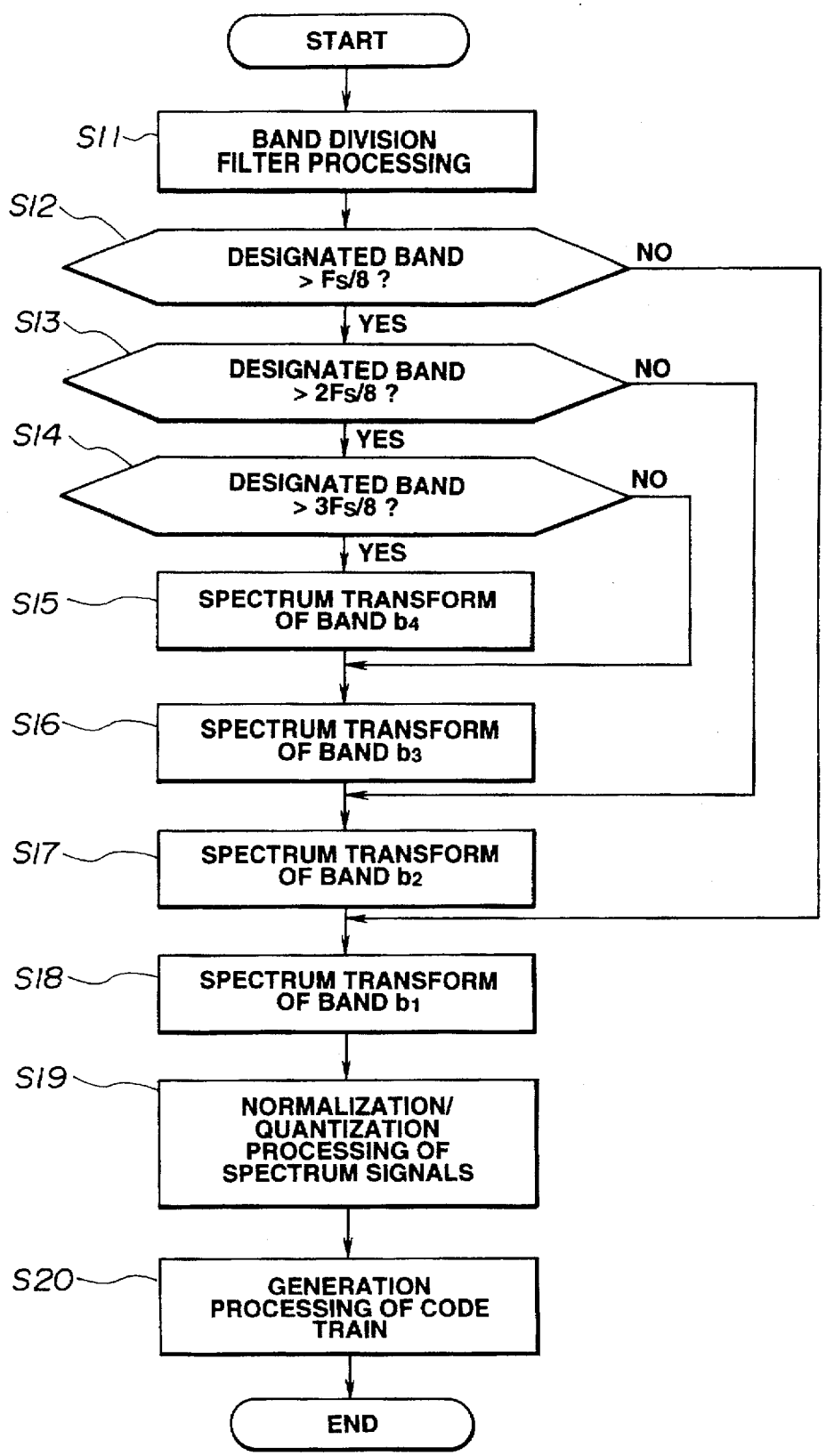
FIG. 17 is a flowchart showing outline of an example of a portion of processing procedure of an encoding method of an embodiment of this invention.

FIG. 17 is an example of the processing of an encoding method for carrying out processing which copes with the first case by making use of this invention. While it is indicated in this example of processing that processing is carried out in dependency upon bands only with respect to the spectrum transform portion, it is a matter of course that, similarly to the above-described encoding apparatus, processing can be simplified also in the band division filter processing of step S11.

In FIG. 17, after band division filter processing is carried out at step S11, whether the designated band is greater than Fs/8, is greater than 2Fs/8, and is greater than 3Fs/8 are respectively discriminated at steps S12, S13, S14. When the designated band is greater than 3Fs/8, spectrum transform processing of bands $b_4$ to $b_1$ are carried out at steps S15 to S18. When the designated band is greater than 2Fs/8 and is less than 3Fs/8, spectrum transform processing of bands $b_3$ to $b_1$ are carried out at steps S16 to S18. When the designated band is greater than Fs/8 and is less than 2Fs/8, spectrum transform processing of bands $b_2$, $b_1$ are carried out at steps S17, S18. When the designated band is less than Fs/8, spectrum transform processing of band $b_1$ is carried out at step S18. After normalization/quantization processing of spectrum coefficients is carried out at the subsequent step S19, processing for generating a code train is carried out at step S20.

Figure 18:
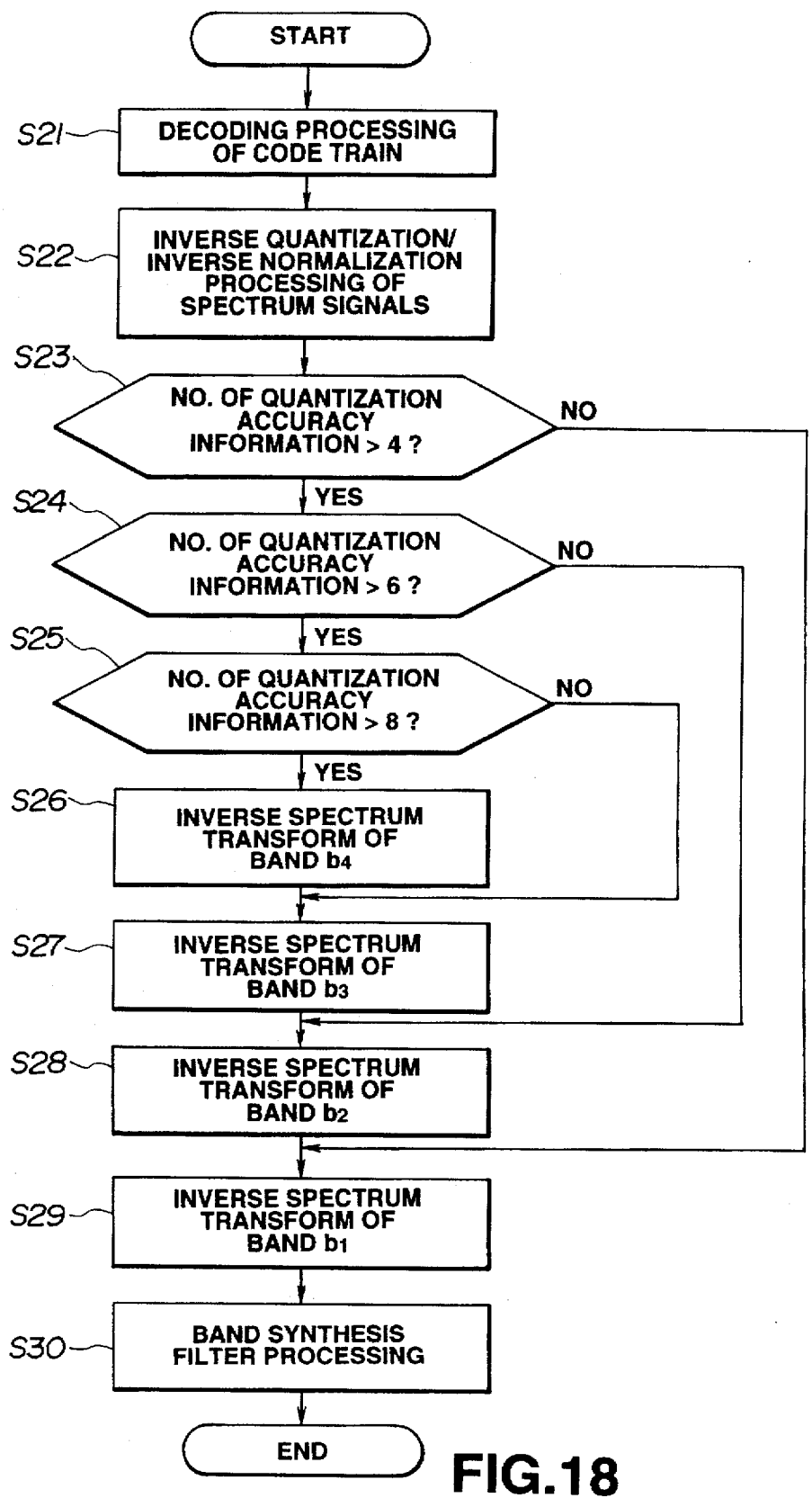
FIG. 18 is a flowchart showing outline of an example of a portion of processing procedure of a decoding method of an embodiment of this invention.

FIG. 18 is an example of the processing of a decoding method for carrying out processing in accordance with the first case. While it is indicated in this example of the processing that processing is carried out in dependency upon bands only with respect to the inverse spectrum transform portion, it is a matter of course that processing can be simplified also in the band synthesis filter processing of step S30 similar to the above-described encoding apparatus.

In FIG. 18, after decoding processing of code train is carried out at step S21 and inverse quantization/inverse normalization processing of spectrum coefficients are carried out at step S22, whether or not No. of quantization accuracy information is greater than 4, is greater than 6, and is greater than 8 are respectively discriminated at steps S23, S24, S25. When No. of quantization accuracy information is greater than 8, inverse spectrum transform processing of bands $b_4$ to $b_1$ are carried out at steps S26 to S29. When No. of quantization accuracy information is greater than 6 and is less than 8, inverse spectrum processing of bands $b_3$ to $b_1$ are carried out at steps S27 to S29. When No. of quantization accuracy information is greater than 4 and is less than 6, inverse spectrum transform processing of bands $b_2$, $b_1$ are carried out at steps S28, S29. When No. of quantization accuracy information is less than 4, inverse spectrum transform processing of band $b_1$ is carried out at step S29. At the last step S30, band synthesis filter processing is carried out.

Figure 19:
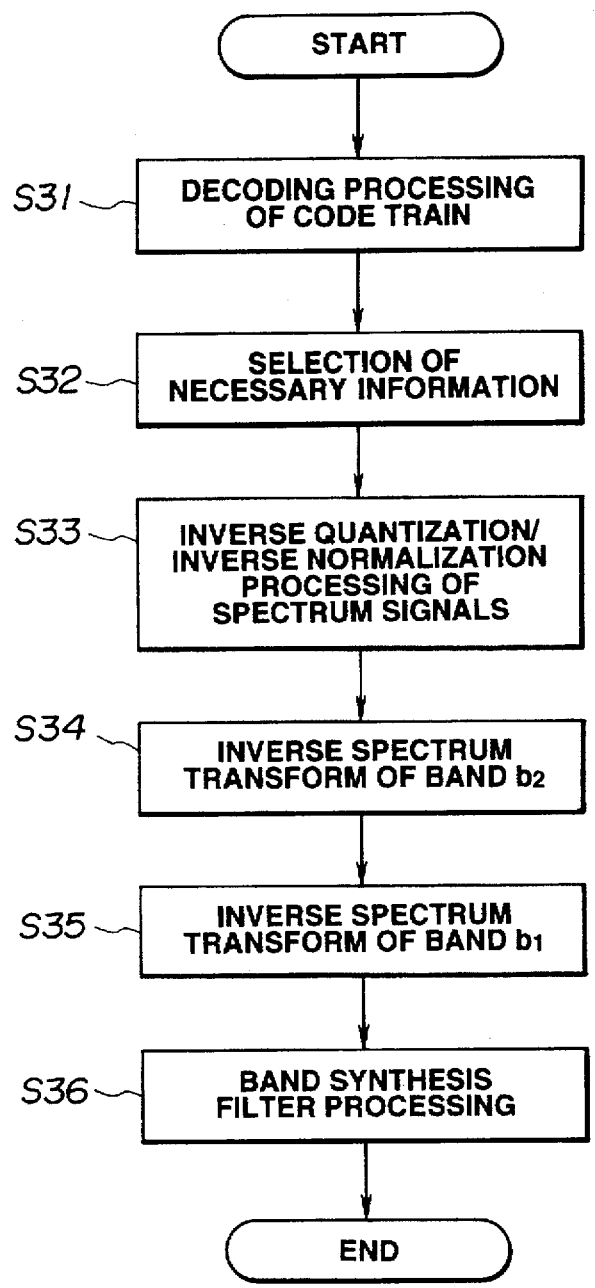
FIG. 19 is a flowchart showing outline of an example of a portion of processing procedure of a decoding method of another embodiment of this invention.

FIG. 19 is another example of a decoding method for carrying out processing in accordance with the second case. In the example of FIG. 19, decoding processing of the code train is carried out at step S31, and selection of necessary information is carried out at step S32. Only information selected at this step is used for the processing described below. Namely, after inverse quantization/inverse normalization processing of spectrum coefficients are carried out at step S33, inverse spectrum transform processing relating to only bands $b_2$, $b_1$ are carried out at steps S34, S35, and band synthesis filter processing is carried out at step S36.

Figure 20:
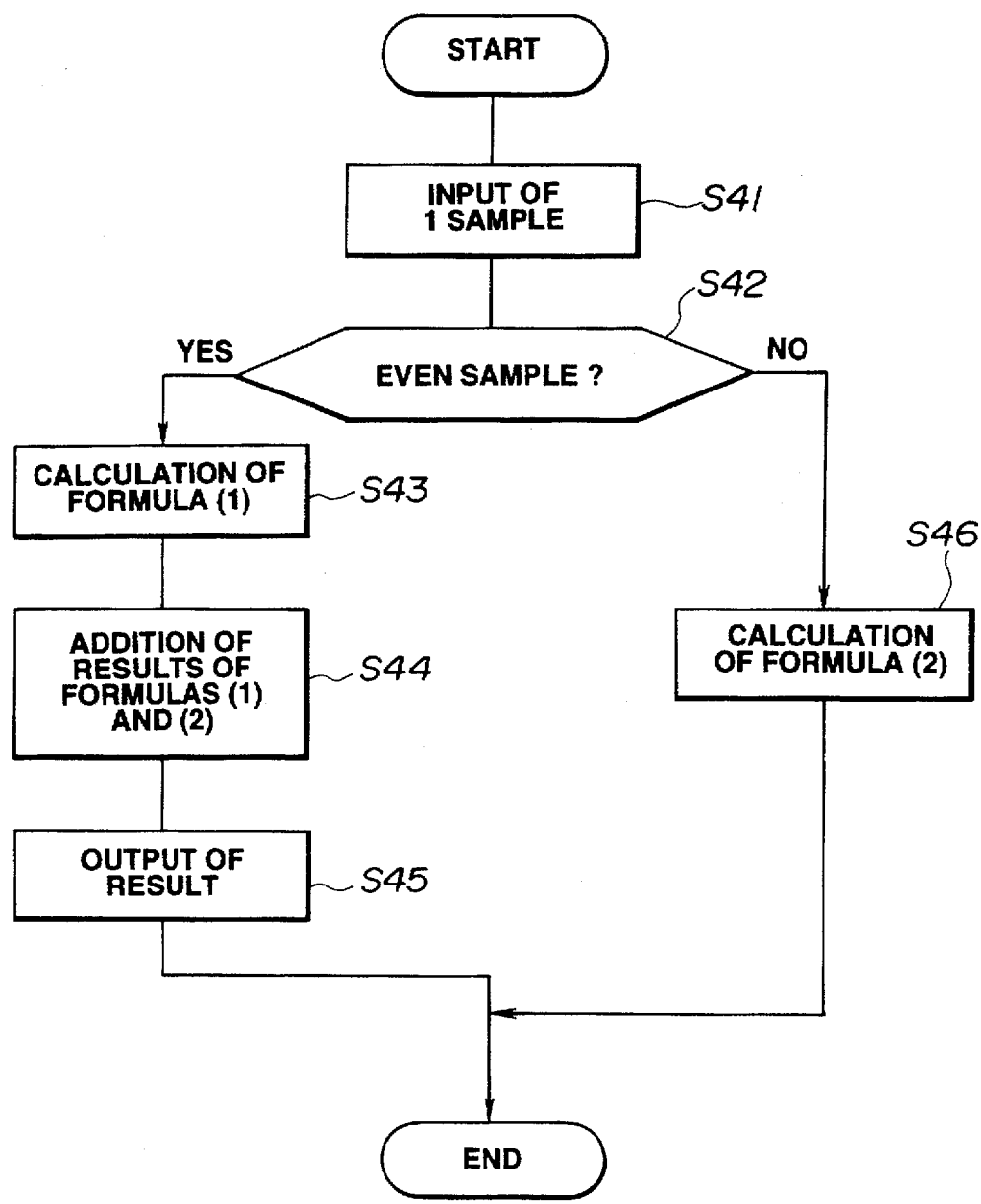
FIG. 20 is a flowchart for explaining an operation (calculating) method of filter of QMF of the embodiment of this invention.

FIG. 20 shows, by flowchart, the process in which software carries out an operation for calculating only a lower frequency band of halved bands by using QMF filter by the encoding method corresponding to the first case of this invention to output it is carried out by software. Steps of S41 to step S46 represent respective steps of the operation.

In FIG. 20, at the first step S41, one sample of time series sample data (hereinafter simply referred to as sample) is input. Thereafter the processing operation proceeds to the subsequent step S42.

At this step S42, it is determined whether the input sample is even or odd. If the input sample is even, the processing operation proceeds to step S43. On the other hand, if the input sample is odd, the processing operation proceeds to step S46. At this step S46, the odd sample input at step S41 is used to execute the operation of the above-mentioned formula (2). Thus, the processing operation is completed.

On the other hand, at step S43, the input sample is used to carry out the calculation of the above-mentioned formula (1). Thus, the processing operation proceeds to the subsequent step S44. At step S44, the result determined at step S43 and the last result of the formula (2) calculated at the step S46 are added. Thus, the operation processing proceeds to the subsequent step S45.

In this case, since samples of the higher frequency band side are unnecessary, it is unnecessary to subtract the result of the formula (2) from the result of the formula (1). Thus, processing quantity can be reduced accordingly. At step S45, the added result from the step S44 is output as a sample of lower frequency band. Thus, processing is completed.

Figure 21:
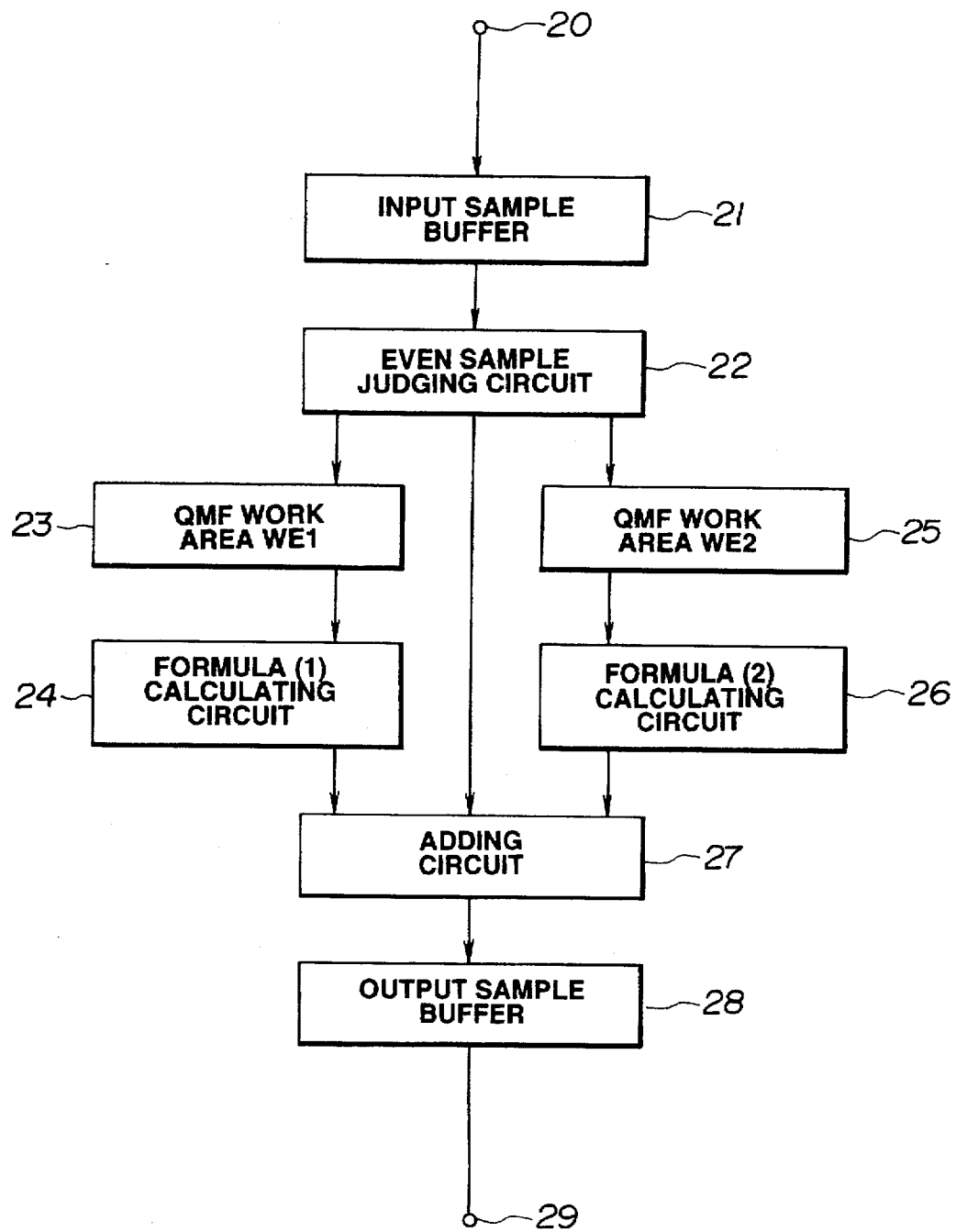
FIG. 21 is a block circuit diagram of an encoding apparatus using an operation (calculating) method of filter of QMF of the embodiment of this invention.

FIG. 21 is a block circuit diagram showing the configuration of an encoding apparatus adapted for carrying out filter operation of QMF by the encoding method of FIG. 20 to output only signals in lower frequency bands.

In FIG. 21, signals delivered through terminal 20 are once (temporarily) stored into an input sample buffer 21 and are sequentially sent to an even sample judging circuit 22. The even sample judging circuit 22 determines whether or not input sample is even, whereby when the input sample is even, it sends this sample to a QMF work area circuit 23, while when the input sample is odd, it sends this sample to a QMF work area circuit 25. Further, in the case where input sample is even, the judging circuit 22 sends, to an adding circuit 27, a signal indicating that the input sample is even.

Data of (L/2) number of samples when the number of taps of QMF is L, including input sample, are stored in the QMF work area circuit 23. A calculating circuit 24 adapted for carrying out calculation by using these sample data performs the calculation of the formula (1) outputs its result to the adding circuit 27. Data of (L/2) number of samples including input sample are similarly stored in the other QMF work area circuit 25. A calculating circuit 26 performs the calculation of the formula (2) by using these sample data to output its result to the adding circuit 27.

This adding circuit 27 receives a signal directly sent from the even sample judging circuit 22, whereby when this signal indicate that input sample is even, it adds output of the calculating circuit 24 and output of the calculating circuit 26 and send its result to an output sample buffer 28.

This output sample buffer 28 stores outputs from the adding circuit 27 to output it through terminal 29 when stored data reaches a predetermined number of data.

Figure 22:
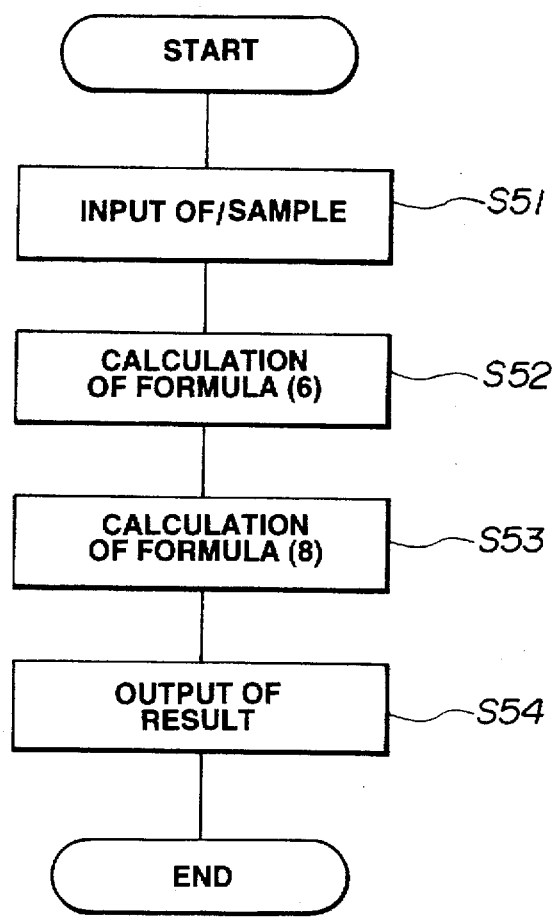
FIG. 22 is a flowchart for explaining an operation (calculating) method of filter of IQMF of the embodiment of this invention.

FIG. 22 shows, by flowchart, process in the case where an operation for synthesizing bands in the state where data of higher frequency band are caused to be 0 (zero) by utilizing the lower frequency band of the halved bands by using filter of IQMF by a decoding method corresponding to the first case of this invention is carried out by software. Steps from step S51 up to step S54 of FIG. 22 represent respective steps of the operation.

In FIG. 22, at the first step S51, one sample of data of lower frequency band is input. Thus, the processing operation proceeds to the subsequent step S52. At the step S52, the calculation of the above-mentioned formula (6) is carried out. In this case, since input of the higher frequency band side is assumed to be 0 (zero), it is unnecessary to perform calculation of $(y_1(m-i)-y_2(m-i))$ of the above-mentioned formula (6). An input $y_1(m-i)$ of the lower frequency band side is directly multiplied by filter coefficients, thereby making it possible to reduce the number of calculations.

At the subsequent step S53, the calculation of the formula (8) is similarly carried out. Thus, the processing operation proceeds to the subsequent step S54. At the step S54, respective results obtained at the step S52 and the step S53 are output. Thus, processing is completed.

Figure 23:
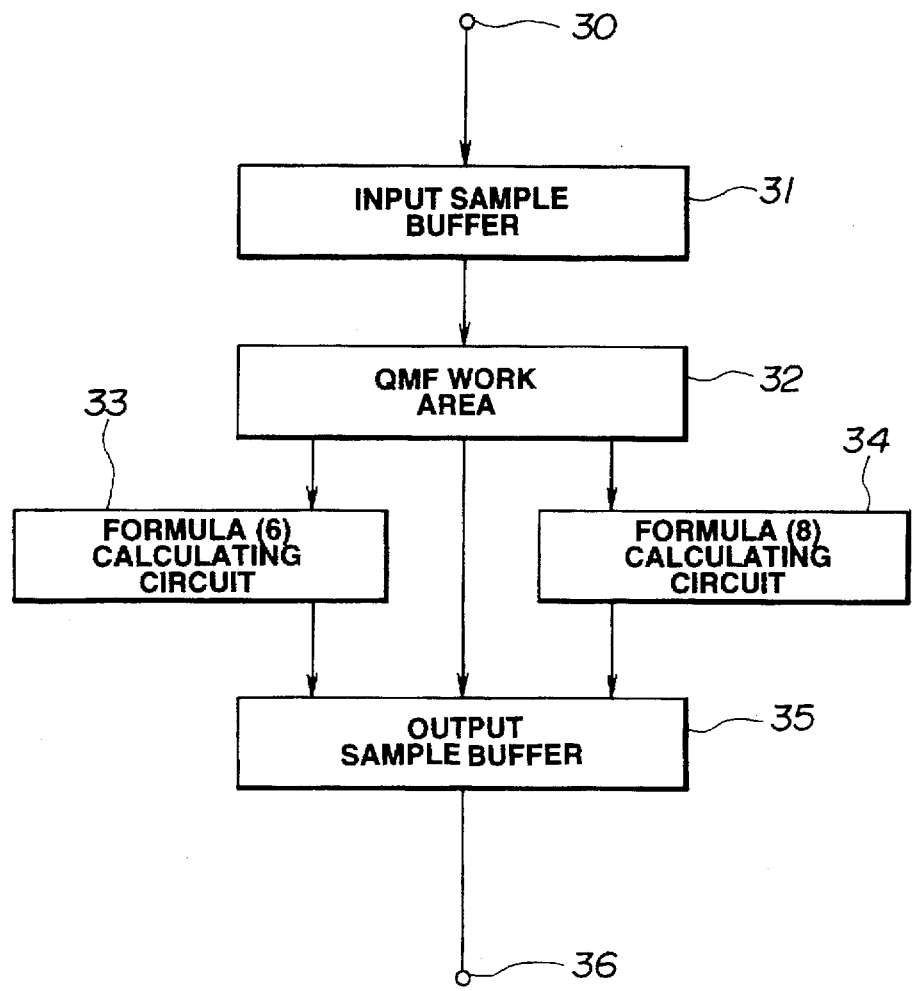
FIG. 23 is a block circuit diagram of a decoding apparatus using operation (calculating) method of filter of IQMF of the embodiment of this invention.

FIG. 23 is a block circuit diagram of a decoding apparatus or performing filter operation of IQMF from only signals in lower frequency bands in the state where signals of higher frequency bands are assumed to be all 0 (zero) by the decoding method of FIG. 22.

In FIG. 23, signals of lower frequency band delivered through terminal 30 are stored (accumulated) into an input sample buffer 31, and one sample thereof is sent to an IQMF work area circuit 32.

(L/2) samples when the number of taps of IQMF is assumed to be L, including input sample, are stored in the IQMF work area circuit 32. Calculating circuits 33, 34 perform calculations of the above-mentioned formulas (6) and (8) respectively corresponding thereto by using samples from the IQMF work area circuit 32.

In this case, since input of the higher frequency band side is 0 (zero), $y_2(m-i)$ becomes equal to zero (0). As described above, $(y_1(m-i)-y_2(m-i))$ of the formula (6) and $(y_1(m-i)+y_2(m-i))$ of the formula (8) both become equal to $y_1(m-i)$. Accordingly, subtraction and addition in these formulas become unnecessary. In addition, since work area for calculation of IQMF can be shared, work area can be also reduced as compared to the case where data of the higher frequency band side exists.

Calculation result of the calculating circuit 33 and calculation result of the calculating circuit 34 are stored into an output sample buffer 35. These data are output through terminal 36 at a time when processing relating to all samples has been completed.

While explanation has been made by taking, as an example, the case where MDCT is used as spectrum transform processing, this invention may be of course applied also to the case where Discrete Fourier Transform (DFT) or Discrete Cosine Transform (DCT), etc. is used. Further, this invention may be applied also to the case where band division is carried out by filter without use of such special spectrum transform processing thereafter to carry out encoding.

Moreover, while explanation has been given in connection with the case where bands of the lower frequency band side are taken as bands where processing is actually carried out, there may be employed, in addition to the above, e.g., a method of processing only bands where actual signal level is high. However, in practice, as previously described, e.g., in ordinary acoustic signals, etc. important signal components are distributed on the lower frequency band side. Accordingly, there is adopted a configuration for processing only the lower frequency band side at all times, thereby making it possible to obtain good results with simple configuration.

It is to be noted that it is a matter of course that this invention may be applied to acoustic signals of multichannel type. In addition, while explanation has been given in connection with the case where acoustic signals are encoded and decoded, this invention is effective also in the case where signals of other kinds are processed. Especially, when applied to acoustic signals or picture signals where important information concentrate on the lower frequency band side, this invention can provide good results.

As is clear from the foregoing description, the information encoding method or apparatus according to this invention is adapted so that transform processing for frequency components is omitted with respect to a portion of bands, and is adapted to carry out actual transform processing only in necessary bands, thereby making it possible to reduce processing quantity in encoding, to simplify the configuration of the information encoding apparatus, and to realize reduced cost.

Moreover, the information decoding method or apparatus according to this invention is adapted to omit processing for synthesizing waveform signal with respect to a portion of bands on the basis of control of the processing band control means, or to use only a portion of information included in an input code train that the information selector means has selected to omit waveform signal synthesis processing with respect to a portion of bands. Namely, an approach is employed to carry out actual transform processing only in necessary bands on the basis of information included in codes to be decoded, thereby making it possible to realize reproduction of waveform signal by simple processing. In addition, the information decoding apparatus selects, from input code, necessary code portion on the basis of bands where the decoding apparatus it-self can actually carry out decoding to reproduce signals of bandwidth corresponding to its ability, thereby making it possible to provide an information decoding apparatus having compatibility at a low cost.

Accordingly, an approach is employed to carry out, in dependency upon required quality of reproduction signal, actual processing for encoding or decoding only in necessary bands, whereby the processing is simplified and encoding or decoding can be carried out at a low cost or at a high speed. Moreover, the information decoding apparatus can reproduce signals of bands corresponding to its ability from the same recorded code. Thus, it become possible to constitute, in accordance with use purposes, an information decoding apparatus of scale and cost comparable thereto. Thus, it is possible to expand bands of signals to be recorded, while maintaining compatibility, with respect to the ability of popular information decoding apparatuses.

Further, an approach is employed to allow bands where processing is omitted to be set to the higher frequency band side to thereby process, at all times, only the lower frequency band side where important signal components are distributed, e.g., in ordinary acoustic signals or picture signals, etc., thereby making it possible to enhance (improve) the processing quantity reduction effect.

Moreover, in carrying out actual transform processing only in necessary bands on the basis of designated band information, etc., operation in performing operation of Quadrature Mirror Filter or Inverse Quadrature Mirror Filter is omitted with respect to bands of the unnecessary side, whereby the number of operations necessary for filter operation is reduced and high speed operation (calculation) can be thus made. Further, since work area necessary for filter operation can be reduced, it is possible to provide a hardware of small scale and low cost. Namely, in the encoding/decoding method and apparatus of this invention, in the case where processing is executed in accordance with required quality of reproduction signal, filter operation can be simplified, and work area can be reduced. Thus, it is possible to carry out processing and encoding and decoding at a low cost or at a high speed.

What is claimed is:

1. An information encoding method for encoding a waveform signal which can be decomposed into frequency components in predetermined frequency bands, the method comprising the steps of:

a step of selecting either a method of decomposing the waveform signal into predetermined bands and selecting any one band thereby omitting one or more of the predetermined bands or a method of decomposing the waveform signal into frequency components so that frequency components of a preselected band of the predetermined bands can be obtained; and encoding frequency components of the selected band obtained by the decomposition.

2. An information encoding method as set forth in claim 1, further includes a step of decomposing the selected band by using a spectrum transform processing.

3. An information encoding method as set forth in claim 2, wherein the step of decomposition includes a step of decomposing the waveform signal by using a band division filter, and wherein the band division filter is at least one stage of Quadrature Mirror Filters for dividing a signal inputted thereto into signals in respective two bands, each of the Quadrature Mirror Filters being operative to perform, in the state where operation relating to the omitted band or bands is omitted, operation relating to only bands except for the omitted band or bands.

4. An information encoding method as set forth in claim 2, wherein the step of the spectrum transform processing carries out the spectrum transform processing only with respect to signals corresponding to the selected bands thereby excluding the omitted one or more bands of signals divided by the band division filter.

5. An information encoding method as set forth in claim 1, wherein the one or more omitted bands is a band of a higher frequency band side of the predetermined bands.

6. An information encoding method as set forth in claim 1, wherein the step of encoding includes a step of quantizing the frequency components obtained by the decomposition on the basis of quantization accuracy information determined every divided predetermined bands, the information encoding method further including a step of encoding the quantization accuracy information and information indicating the number of the quantization accuracy information.

7. An information decoding method for decoding an encoded signal generated by decomposing a waveform signal which can be decomposed into frequency components in predetermined frequency bands into frequency components so that frequency components in bands obtained by omitting a portion of the predetermined bands can be obtained to encode the frequency components obtained by the decomposition, the method comprising the steps of:
    decoding the encoded signal to generate decoded frequency components;
    specifying the omitted band or bands;
    synthesizing the decoded frequency components in the state where synthesis processing relating to the specified band or bands is omitted to generate the waveform signal.

8. An information decoding method as set forth in claim 7, wherein the step of synthesis includes at least one of a step of synthesizing the decoded frequency components by using the inverse spectrum transform processing and a step of synthesizing the decoded frequency components by using a band synthesis filter.

9. An information decoding method as set forth in claim 8, wherein the step of synthesis includes a step of synthesizing the decoded frequency components by using the band synthesis filter, and wherein the band synthesis filter is at least one stage of Inverse Quadrature Mirror Filters for synthesizing respective input signals in two divided bands, each of the Inverse Quadrature Mirror Filters being operative to perform, in the state where operation relating to the omitted band or bands is omitted, operation relating to bands except for the omitted band or bands.

10. An information decoding method as set forth in claim 8, wherein the step of synthesis includes both the step of synthesizing the decoding frequency components by using the inverse spectrum transform processing, and the step of synthesizing the decoded frequency components by using the band synthesis filter, and wherein the step of the inverse spectrum transform processing carries out the inverse spectrum transform processing only with respect to frequency components corresponding to bands except for the omitted band or bands.

11. An information decoding method as set forth in claim 7, wherein the omitted band or bands is or are a band or bands of the higher frequency band side of the predetermined bands.

12. An information decoding method as set forth in claim 7, wherein the encoded signal includes, every predetermined frequency bands, corresponding quantization accuracy information and information indicating the number of the quantization accuracy information, wherein the step of decoding the encoded signal includes a step of inversely quantizing the encoded signal on the basis of the quantization accuracy information, and wherein the specifying step specifies the omitted band or bands on the basis of the information indicating the number of the quantization accuracy information.

13. An information encoding apparatus adapted for encoding a waveform signal which can be decomposed into frequency components in predetermined frequency bands, the apparatus comprising:

means for selecting either a method of decomposing the waveform signal into predetermined bands and selecting any one band thereby omitting one or more of the predetermined bands or a method of decomposing the waveform signal into frequency components so that frequency components of a preselected band of the predetermined bands can be obtained; and encoding means for encoding frequency components of the selected band obtained by the decomposition.

14. An information encoding apparatus as set forth in claim 13, further includes transform means for decomposing the waveform signal by using a spectrum transform processing.

15. An information encoding apparatus as set forth in claim 14, wherein the decomposing means includes a filter means, and wherein the band division filter is at least one stage of Quadrature Mirror Filters for dividing a signal inputted thereto into signals in respective two bands, each of the Quadrature Mirror Filters being operative to perform, in the state where operation relating to the omitted band or bands is omitted, operation relating to only bands except for the omitted band or bands.

16. An information encoding apparatus as set forth in claim 14, wherein the decomposing means includes both a filter means and the transform means, and wherein the transform means carries out the spectrum transform processing only with respect to signals corresponding to signals in the selected bands of signals divided by the band division filter, thereby excluding the omitted one or more bands of the predetermined bands.

17. An information encoding apparatus as set forth in claim 13, wherein the one or more omitted bands is a band of a higher frequency band side of the predetermined bands.

18. An information encoding apparatus as set forth in claim 13, wherein the encoding means includes means for quantizing the frequency components obtained by the decomposition on the basis of quantization accuracy information determined every divided predetermined bands, the encoding apparatus further including means for encoding the quantization accuracy information and information indicating the number of the quantization accuracy information.

19. An information decoding apparatus adapted for decoding an encoded signal generated by decomposing a waveform signal which can be decomposed into frequency components in predetermined frequency bands into frequency components so that frequency components in a band or bands obtained by omitting a portion of the predetermined bands can be obtained to encode the frequency components obtained by the decomposition, the apparatus comprising:
decoding means for decoding the encoded signal to generate decoded frequency components;
specifying means for specifying the omitted band or bands; and
synthesis means for synthesizing the decoded frequency components in the state where synthesis processing relating the specified band or bands is omitted to generate the waveform signal.

20. An information decoding apparatus as set forth in claim 19,
wherein the synthesis means includes at least one of inverse transform means for synthesizing the decoded frequency components by using the inverse spectrum transform processing and filter means for synthesizing the decoded frequency components by using a band synthesis filter.

21. An information decoding apparatus as set forth in claim 20,
wherein the synthesis means includes the filter means, and
wherein the band synthesis filter is at least one stage of Inverse Quadrature Mirror Filters for synthesizing respective input signals in two divided bands,
each of the Inverse Quadrature Mirror Filters being operative to perform, in the state where operation relating to the omitted band or bands is omitted, operation relating to only bands except for the omitted band or bands.

22. An information decoding apparatus as set forth in claim 20,
wherein the synthesis means includes both the inverse transform means and the filter means,
the inverse transform means being operative to carry out the inverse spectrum transform processing only with respect to frequency components corresponding to bands except for the omitted band or bands.

23. An information decoding apparatus as set forth in claim 19,
wherein the omitted band or bands is or are a band or bands of the higher frequency band side of the predetermined bands.

24. An information decoding apparatus as set forth in claim 19,
wherein the encoded signal includes, every predetermined bands, corresponding quantization accuracy information and information indicating the number of the quantization accuracy information,
wherein the decoding means includes means for inversely quantizing the encoded signal on the basis of the quantization accuracy information, and
wherein the specifying means specifies the omitted band or bands on the basis of the information indicating the number of the quantization accuracy information.

25. An information decoding method for decoding an encoded signal generated by decomposing a waveform signal into frequency components in predetermined frequency bands to encode the frequency components obtained by the decomposition,
the method comprising the steps:
selecting only a portion of encoded signal components from the encoded signal;
decoding the selected encoded signal components to generate decoded frequency components; and
synthesizing the waveform signal by using the decoded frequency components.

26. An information decoding method as set forth in claim 25,
wherein the selected encoded signal components are signal components corresponding to bands of the lower frequency band side of the predetermined bands.

27. An information decoding method as set forth in claim 25,
wherein the step of synthesis includes at least one of a step of synthesizing the decoded frequency components by using the inverse spectrum transform processing and a step of synthesizing the decoded frequency components by using a band synthesis filter.

28. An information decoding apparatus adapted for decoding an encoded signal generated by decomposing a waveform signal into frequency components in predetermined frequency bands to encode the frequency components obtained by the decomposition,
the apparatus comprising:
selector means for selecting only a portion of encoded signal components from the encoded signal;
decoding means for decoding the selected encoded signal components to generate decoded frequency components; and
synthesis means for synthesizing the waveform signal by using the decoded frequency component.

29. An information decoding apparatus as set forth in claim 28,
wherein the selector means selects only signals corresponding to bands of the lower frequency band side of the predetermined bands.

30. An information decoding apparatus as set forth in claim 28,
wherein the synthesis means includes at least one of inverse transform means for synthesizing the decoded frequency components by using the inverse spectrum transform processing and filter means for synthesizing the decoded frequency components by using a band synthesis filter.

31. An information encoding method for encoding a waveform signal which can be decomposed into frequency components in predetermined frequency bands, the method comprising the steps of:

decomposing the waveform signal by carrying out filter processing for at least one band of the predetermined bands wherein one or more bands of the predetermined bands is omitted from filter processing;

encoding frequency components of the at least one band of the predetermined bands.

32. An information encoding apparatus adapted for encoding a waveform signal which can be decomposed into frequency components in predetermined frequency bands, the apparatus comprising:

decomposing means for decomposing the waveform signal bands by carrying out filter processing for at least one band of the predetermined bands wherein one or more bands is omitted from filter processing; and encoding means for encoding frequency components of the at least one band.

* * * * *